United States Patent
Kamata et al.

[11] Patent Number: 6,053,564
[45] Date of Patent: Apr. 25, 2000

[54] VEHICLE BODY SIDE SILL REINFORCING BULKHEAD

[75] Inventors: Toru Kamata; Susumu Nishimoto, both of Okazaki, Japan

[73] Assignee: Mitsubishi Jidosha Kogyo K.K., Tokyo, Japan

[21] Appl. No.: 08/914,749

[22] Filed: Aug. 20, 1997

[30] Foreign Application Priority Data

Aug. 21, 1996 [JP] Japan .................................. 8-220059

[51] Int. Cl.⁷ .................................................. B62D 27/02
[52] U.S. Cl. ............................. 296/188; 296/30; 296/209
[58] Field of Search ............................ 296/30, 188, 189, 296/203.03, 204, 209

[56] References Cited

U.S. PATENT DOCUMENTS

| | | | |
|---|---|---|---|
| 3,132,891 | 5/1964 | Pyuro et al. | 296/28 |
| 4,470,619 | 9/1984 | Imajyo et al. | 280/808 |
| 4,673,205 | 6/1987 | Drewek . | |
| 5,125,715 | 6/1992 | Kijima | 296/189 |
| 5,242,209 | 9/1993 | Yamauchi | 296/188 |
| 5,370,438 | 12/1994 | Mori et al. | 296/203 |

FOREIGN PATENT DOCUMENTS

| | | | |
|---|---|---|---|
| 772494 | 1/1972 | Belgium . | |
| 0055398 | 7/1982 | European Pat. Off. | 296/188 |
| 0619215A | 10/1994 | European Pat. Off. . | |
| 4304920 | 9/1993 | Germany | 296/189 |
| 56-053966 | 5/1981 | Japan . | |
| 0045484 | 3/1985 | Japan | 296/188 |
| 0309881 | 12/1989 | Japan | 296/189 |
| 0079477 | 4/1991 | Japan | 296/204 |
| 0408677 | 1/1992 | Japan | 296/188 |
| 0439172 | 2/1992 | Japan | 296/188 |
| 0450083 | 2/1992 | Japan | 296/189 |
| 0459490 | 2/1992 | Japan | 296/204 |
| 0481371 | 3/1992 | Japan | 296/209 |
| UM2573686 | 12/1993 | Japan . | |
| 9013467 | 11/1990 | WIPO . | |
| 9406669 | 3/1994 | WIPO . | |

*Primary Examiner*—D. Glenn Dayoan
*Assistant Examiner*—Paul Chenevert

[57] ABSTRACT

A body has a front side member and a side sill connected thereto. The side sill is disposed outwardly of and below the front side member in the width and height directions of the body. At a junction between the front side member and the side sill, a reinforcement member for reinforcing the junction is provided. The reinforcement member has a longitudinal wall and front and rear walls extending in the body width direction and functioning as bulkheads, and permits the junction to resist a bending moment caused by an impact force applied to the front of the body and acting on the junction in the backward, upward and inward directions of the body. Especially in an offset crash, the reinforcement member restrains a deformation of the side sill and decreases a recession of a front pillar, to thereby reduce a deformation of the passenger cabin.

12 Claims, 7 Drawing Sheets

VEHICLE BODY SIDE SILL REINFORCING BULKHEAD

BACKGROUND OF THE INVENTION

1. Technical Field

The present invention relates to a body construction, and more particularly, to an offset-crash-resistant vehicle body construction.

2. Related Arts

Vehicle bodies are divided into two major categories: bodies of construction with a frame, having a frame which is separate from the body and on which an engine, suspensions, a steering and the like are mounted; and bodies of frameless construction, having a frame integrated with the body.

Figure 9:
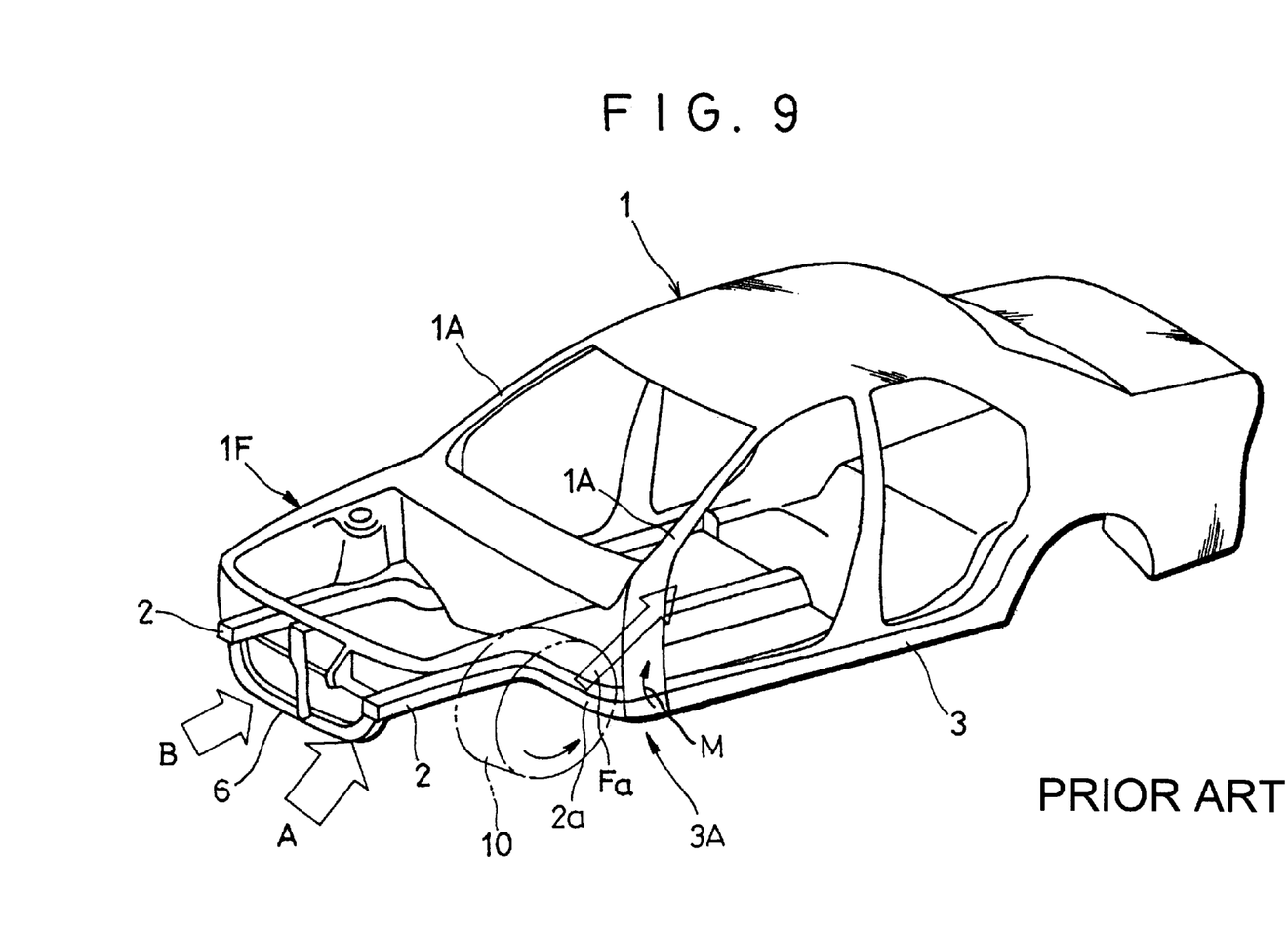
FIG. 9 is a perspective view of a prior art body construction.

A monocoque construction (unitary construction) is a frameless construction and as shown in FIG. 9 has frame parts such as a side member 2, a side sill 3, and a cross member 6 which are formed into one piece with a body 1. Generally, a body of monocoque construction is higher in rigidity and productivity and lighter in weight than a body of construction with a separate frame. Consequently, at the present time, the monocoque construction is employed in almost all passenger cars.

The aforementioned body 1 has a front body 1F which has left and right front side members 2 thereof respectively constituting lower left and right portions of the front body. Each front side member 2 has a rear end portion 2a thereof extending backward in the longitudinal direction, outward in the width direction, and downward in the height direction of the body 1 from a rear portion of an engine compartment room defined in the front body. The left and right front side members 2 are connected at their rear ends to the front ends of the left and right side sills 3, respectively. A junction between these elements 2 and 3 is indicated by reference numeral 3A. Left and right front pillars 1A extend from the front end portions of the left and right side sills 3 integrally therewith, respectively.

Figure 10:
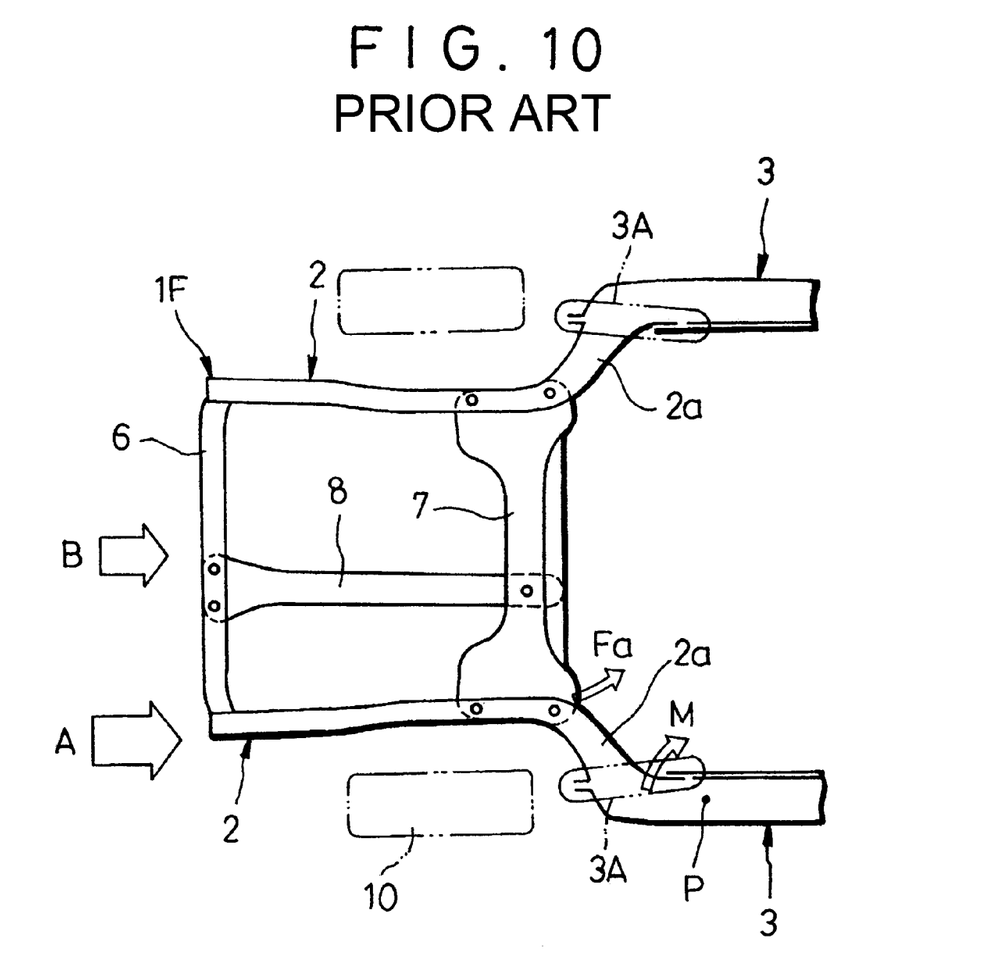
FIG. 10 is a plan view showing the main portion of a front body shown in FIG. 9.

As shown in FIG. 10, the left and right front side member 2 have their front ends mutually connected through a front cross member 6, and intermediate portions thereof mutually connected through a chassis cross member 7. The front cross member 6 is connected to the chassis cross member 7 through a chassis center member 8.

Although the body 1 of monocoque construction has a high rigidity, it can be deformed by an excessively large external force. For example, when a car comes into an offset crash at its front left body portion as shown by the arrow A in FIGS. 9 and 10, an impact force Fa shown by the open arrow acts on the left junction 3A and the left side sill 3 through the left front side member 2. Since the left side sill 3 is located at a lower position in the height direction and at an outside position in the width direction relative to the left front side member 2, a moment M caused by the impact force Fa is applied to the left junction 3A and the left side sill 3. The moment M acts so as to bend the left junction 3A and the front end portion of the left side sill 3 upward around the point P (as viewed in the body height direction), and acts so as to bend them clockwise around the point P as viewed in a plane. Consequently, in the vicinity of the left junction 3A, the left front side member 2 and the left side sill 3 are bent, and the left front pillar 1A is receded, so that the passenger cabin is largely deformed.

The bending phenomenon is encouraged by a torsional deformation of the side sill 3 by which the side sill is largely decreased in its cross sectional area so as to be crushed. This phenomenon is further encouraged by the increase of the moment M which is caused when the left tire 10 strikes the rear end portion 2a of the front side member.

Similarly, when the car comes into an offset crash at a front right body portion, the right front side member 2 and the right side sill 3 are bent in the vicinity of the right junction 3A, so that the right front pillar 1A is receded and the cabin is largely deformed.

Furthermore, when the car is in a head-on crash as shown by the arrow B, the resultant impact force causes the body to be deformed such that the front end portions of the left and right side sills 3 are bent outward in the body width direction and downward in the body height direction, so that the cabin is deformed.

SUMMARY OF THE INVENTION

An object of the present invention is to provide a body construction in which side sill deformation, especially side sill deformation caused at the time of an offset crash, is suppressed so as to decrease a recession of a front pillar, thereby decreasing a deformation of a passenger cabin.

According to the present invention, a body construction is provided having: left and right front side members disposed on opposite sides of a front of a body and extending in a longitudinal direction of the body; left and right side sills extending in the longitudinal direction of the body and longitudinally rearward the front side members, each side sill being disposed outwardly of the front side member concerned in a width direction of the body and below the front side member in a height direction of the body; and left and right front side member extensions extending from the front side members to the respective side sills and connecting the front side members to the side sills, respectively.

The body construction of the present invention comprises first reinforcement members secured to the front end portions of the left and right side sills. Each of the first reinforcement members has a longitudinal wall thereof extending in the longitudinal direction of the body and at least one transverse wall thereof extending from the longitudinal wall in the width direction of the body.

According to the body construction of the present invention having the aforementioned structure, each side sill has a front end portion thereof reinforced by a respective first reinforcement member and has a rigidity which resists a bending moment caused by an impact force applied thereto through the corresponding front side member concerned. Consequently, in a car having the body construction of the present invention, deformation of the side sill can be prevented when the car is in a crash, especially when the car is in an offset crash. Therefore, the resultant recession of the front pillars can be decreased, and hence a deformation of the passenger cabin can be limited. The reinforcement construction using the first reinforcement members is simple, so the respective side sills can be reinforced easily at low cost.

Preferably, the body construction further comprises a second reinforcement member extending in the width direction of the body between those reinforced portions of the side sills to which the first reinforcement members are respectively secured. The second reinforcement member connects the portions reinforced by the first reinforcement members to each other.

With the above preferred body construction, the front end portions of the left and right side sills reinforced by the second reinforcement member can resist a bending moment, so that the side sills are prevented bending inwardly under a bending moment.

Preferably, each of the first reinforcement members has front and rear transverse walls respectively extending from front and rear ends of the longitudinal wall in the width direction of the body. More preferably, each of the left and right side sills includes a side sill outer and a side sill inner, and is formed into an elongated box having a rectangular transverse cross section. The longitudinal walls of the first reinforcement members are secured to the inner side sills. More preferably, the body construction further comprises outer side sill reinforcements respectively secured to inner side sills of the left and right side sills. Each of outer side sill reinforcements defines therein an accommodation space in which the first reinforcement member associated therewith is received and which is open on a side thereof close to the inner side sill associated therewith. The front and rear transverse walls of each of the first reinforcement members are disposed in the accommodation space of and secured to the outer side sill reinforcements associated therewith.

Preferably, each of the first reinforcement members also has an upper wall thereof extending between upper edges of the front and rear transverse walls, and a lower wall thereof extending between lower edges of the front and rear transverse walls. Each first reinforcement member is formed into a box shape. More preferably, each of the first reinforcement members is fabricated from a box-like member obtained by deep drawing and having walls thereof respectively corresponding to the front and rear transverse walls of the first reinforcement member concerned. The walls of the box-like member are each formed with a notch. Wall portions, adjacent to the notch, of each wall of the box-like member are overlapped one another and welded together, whereby each first reinforcement member is so fabricated as to be closely fitted into the accommodation space of the outer side sill reinforcement concerned.

With these preferred body constructions, a further increased rigidity of the first reinforcement members and of the side sills can be attained.

Preferably, the body construction further comprises inner front side members disposed to overlap rear end portions of the front side members; and inner side sill reinforcements disposed to overlap the front end portions of the side sills. The longitudinal wall of each first reinforcement member has a front end portion thereof overlapped with the rear end portion of a respective front side member and a rear end portion of the inner front side member, and a rear end portion thereof overlapped with the front end portion of the side sill reinforcement inner. More preferably, rear ends of the front side member and the front side member inner are positioned on a side close to a front of the body with respect to a front end of the side sill reinforcement inner in the longitudinal direction of the body, so as to be spaced from the front end of the side sill reinforcement inner.

According to the above preferred embodiments, the rigidity of the rear end portion of the front side member and the front end portion of the side sill can be improved, while making the reinforcement components around these portions light in weight.

Preferably, the front end portion of the longitudinal wall of the first reinforcement member, the rear end portion of the front side member, a rear end potion of the front side member inner, and the front end portion of the side sill are mutually fastened at two points which are apart from each other in the height direction of the body. The rear end portion of the longitudinal wall of the first reinforcement member, the front end portion of the side sill, and a front end portion of the side sill reinforcement inner are mutually fastened at two points apart from each other in the height direction of the body. An intermediate portion of the longitudinal wall of the first reinforcement member and the front end portion of the side sill are mutually fastened at one position located in an area between the rear ends of the front side member and the front side member inner and the front end of the side sill reinforcement inner in the longitudinal direction of the body.

According to the above preferred embodiment, the rear end portion of the front side member, the front end portion of the side sill, and related elements disposed therearound can be easily and surely fastened one another, so that assembling can be made efficiently.

In the body construction provided with a second reinforcement member, preferably, the second reinforcement member is bent at its opposite end portions. These opposite end portions extend along inside surfaces of the front end portions of the side sills, respectively. Each end portion of the second reinforcement member is fastened together with the longitudinal wall of the first reinforcement member, the front side member, the front side member inner, and the side sill, at one of the two fastening points where the front end portion of the longitudinal wall of the first reinforcement member, the rear end portion of the front side member, the rear end portion of the front side member inner, and the front end portion of the side sill are fastened together. Furthermore, each end portion of the second reinforcement member is fastened together with the longitudinal wall of the first reinforcement member and the side sill in an area between the rear ends of the front side member and the front side member inner and the front end of the side sill reinforcement inner in the longitudinal direction of the body.

According to the above preferred embodiment, even in a case where a second reinforcement member is used, the rear end portion of the front side member, the front end portion of the side sill and related elements disposed therearound can be easily and surely secured, and thus the assembling efficiency is excellent.

DETAILED DESCRIPTION

A body of monocoque construction according to a first embodiment of the present invention will be described below.

Figure 1:
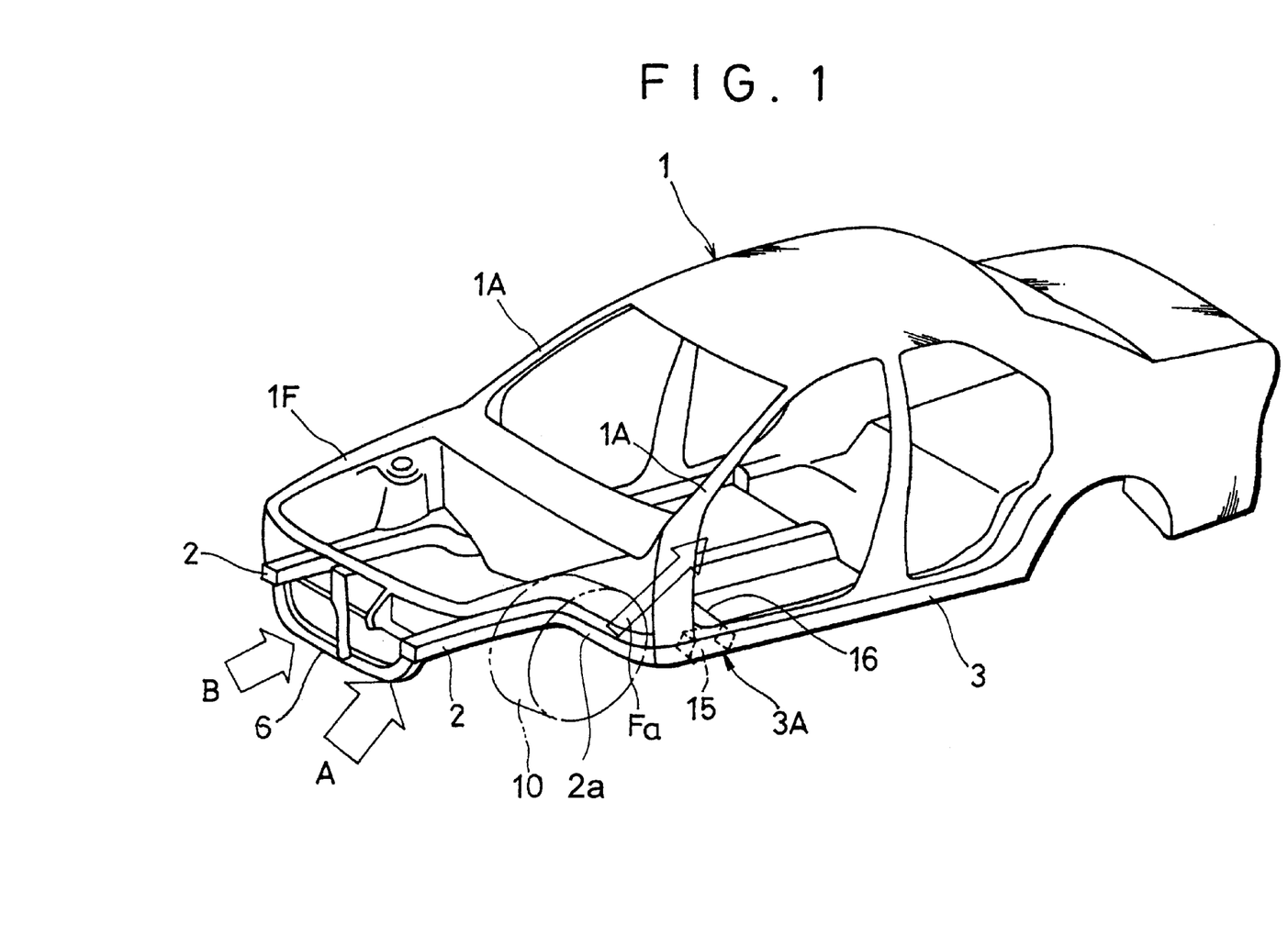
FIG. 1 is a perspective view showing a body construction according to a first embodiment of the present invention.

As shown in FIG. 1, a body 1 has left and right front side members 2 thereof respectively disposed on opposite sides of the front of the body in which an engine compartment is defined, and extending in the body longitudinal direction. Left and right side sills (left side sill is indicated by reference numeral 3) of the body are disposed rearward of the elements 2 in the longitudinal direction of the body, and extend in the longitudinal direction of the body. Each of the side sills 3 is positioned outside and below the associated front side member 2 in the width and height directions of the body. Rear end portions 2a (more generally, front side member extensions which are integrated with or separate from the elements 2) of the left and right front side members 2 are respectively connected to the left and right side sills 3. That is, the rear end portion 2a of each front side member 2 extends from an intermediate portion of the element 2 toward the side sill 3 outward in the body width direction, downward in the body height direction, and backward in the body longitudinal direction.

At a junction 3A between the rear end portion 2a of the front side member 2 and the front end portion of the side sill 3, a first reinforcement member (in FIG. 1, a first reinforcement member disposed on the left side of the body is indicated by reference numeral 15) and a second reinforcement member 16 extending in the body width direction are provided. The left end of the second reinforcement member 16 is connected to a reinforced portion, reinforced by the first reinforcement member 15, of the left side sill 3. Although an illustration is omitted, the right end of the second reinforcement member 16 is connected to a reinforced portion, reinforced by the associated first reinforcement member, of the right side sill. Accordingly, the reinforced portions of the left and right side sills 3 are mutually connected through the second reinforcement member 16. Left and right front pillars 1A respectively extend from the front end portions of the left and right side sills 3 integrally therewith.

Figure 2:
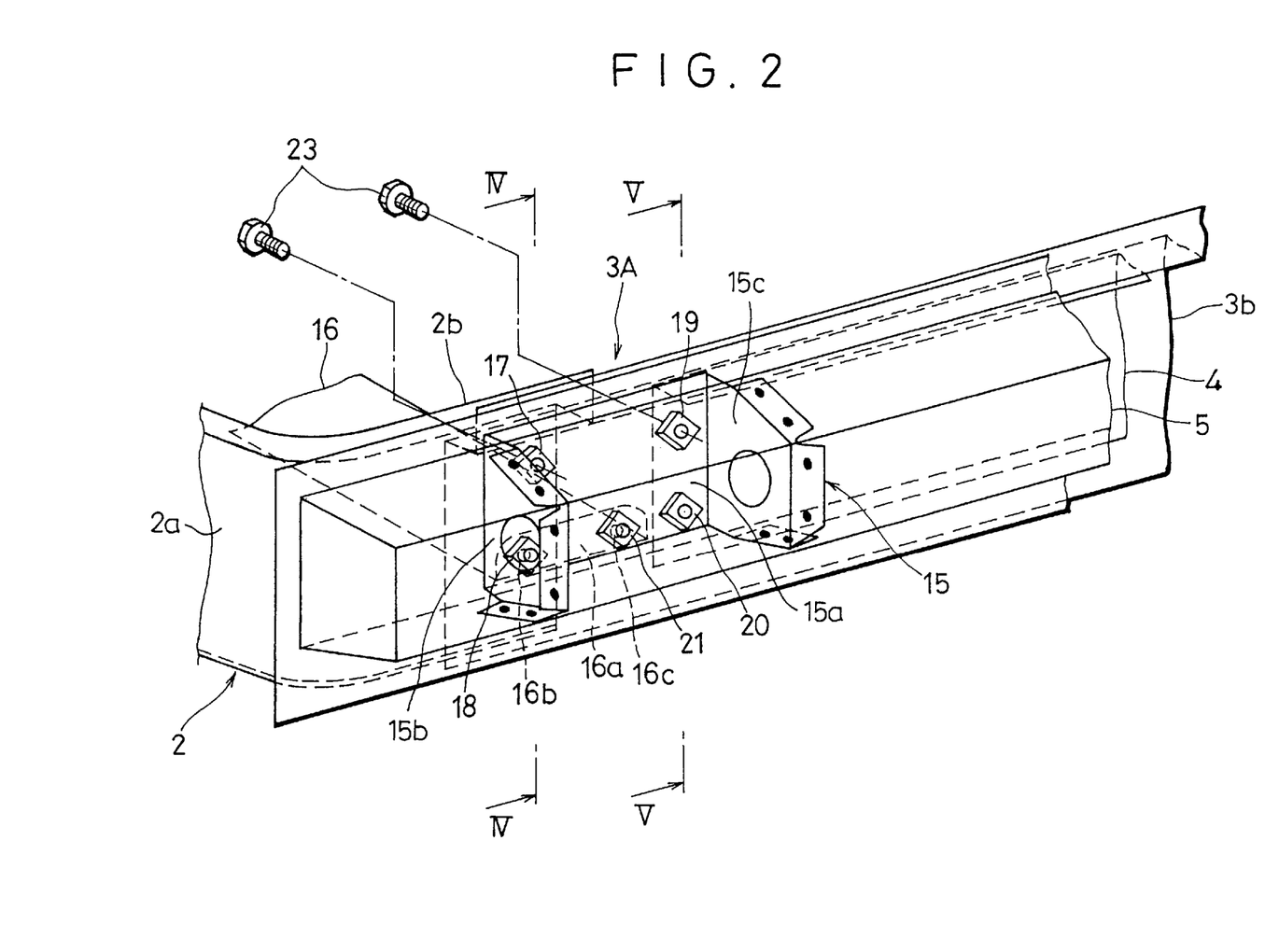
FIG. 2 is an enlarged perspective view of a junction, shown in FIG. 1, between a rear end portion of a left front side member and a front end portion of a left side sill.
Figure 4:
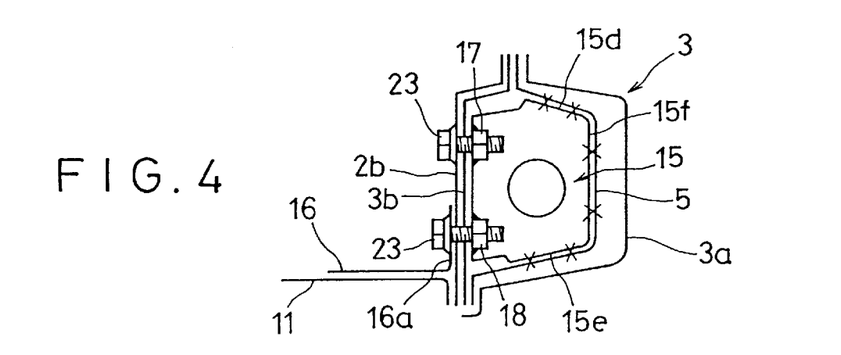
FIG. 4 is a sectional view taken along the line IV—IV of FIG. 2.
Figure 5:
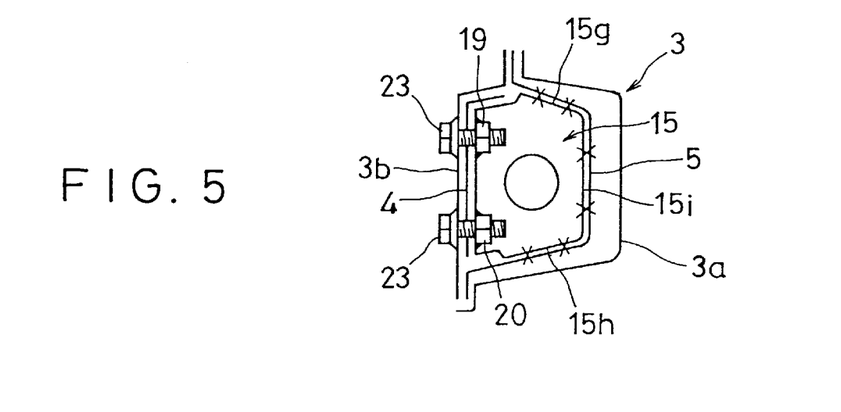
FIG. 5 is a sectional view taken along the line V—V of FIG. 2.

FIGS. 2, 4, and 5 show in detail the structure around the junction 3A on the left side of the body. The right junction has a structure similar to that of the left junction 3A, and hence an illustration and description in respect of the right junction are omitted.

As shown in FIGS. 4 and 5, the left side sill 3 is comprised of an outer side sill 3a thereof formed into a U-shape in cross section, and an inner side sill 3b thereof formed into an L-shape in cross section. The left side sill 3 is formed, as a whole, into an elongated box which has a rectangular cross section. The elements 3a and 3b have their upper and lower edge portions at which they are joined to each other.

As shown in FIGS. 4 and 5, a left side sill outer reinforcement 5 is disposed between the left outer side sill 3a and the left inner side sill 3b. The element 5 has an upper edge portion thereof held between the upper edge portions of the elements 3a and 3b, and the lower edge portion thereof held between the lower edge portions of the elements 3a and 3b. The left side sill outer reinforcement 5 has an elongated box section which is open on the side thereof adjacent to inner side sill 3b. The box section defines therein an accommodation space in which the first reinforcement member 15 is received.

The first reinforcement member 15 has a longitudinal wall 15a thereof extending in the body longitudinal direction, and has front and rear transverse walls 15b and 15c thereof extending outward in the body width direction from the front and rear ends of the longitudinal wall 15a, respectively. The longitudinal wall 15a is disposed along the open face of the side sill outer reinforcement 5. The transverse walls 15b and 15c are disposed in the accommodation space defined in the side sill outer reinforcement 5, and are secured to the inside surface of the side sill outer reinforcement 5 as described later.

A left side sill inner reinforcement 4 is disposed to overlap the inside surface (outer surface as viewed in the body width direction) of the left inner side sill 3b. The longitudinal wall 15a of the first reinforcement member 15 is disposed to overlap the inside surface of the left side sill inner reinforcement 4. A left inner front side member 2b by which the element 2 is reinforced is disposed to overlap the inside surface of the rear end portion 2a of the left front side member 2.

The longitudinal wall 15a of the first reinforcement member 15 has the front end portion thereof overlapped with the rear end portions of the front side member 2 and the front inner side member 2b, and has the rear end portion thereof overlapped with the front end portion of the side sill reinforcement inner 4. That is, the rear ends of the front side members 2 and the inner front side member 2b are located rearward of the front transverse wall 15b of the first reinforcement member 15 in the longitudinal direction of the body. The front end of the side sill inner reinforcement 4 is located on the side close to the front of the body with respect to the rear transverse wall 15c of the first reinforcement member in the body longitudinal direction. Accordingly, the rear ends of the front side members 2 and the inner front side members 2b are located on the side close to the front of the body with respect to the front end of the left side sill inner reinforcement 4 in the longitudinal direction, so that the rear ends of the elements 2 and 2b are positioned apart from the front end of the left side sill inner reinforcement 4.

Figure 3:
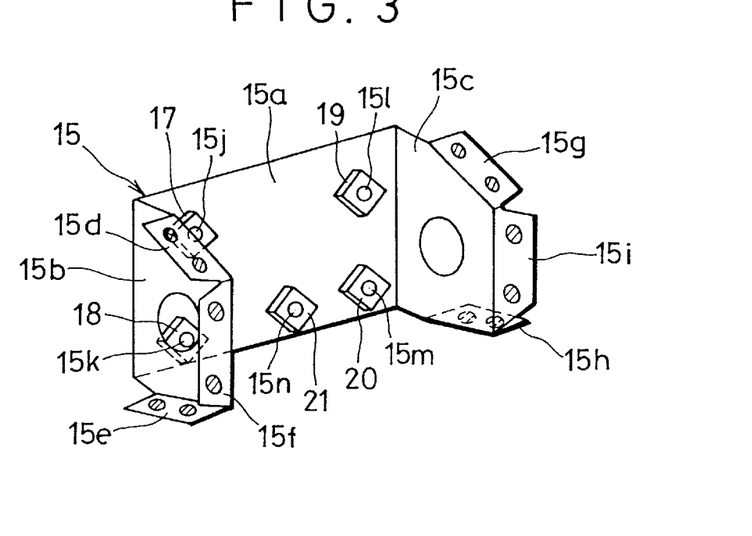
FIG. 3 is a perspective view showing, by way of example, a first reinforcement member disposed at the junction shown in FIG. 2.

FIG. 3 shows the detail of the first reinforcement member 15. As shown in FIG. 3, the first reinforcement member 15 has opposite end portions thereof bent outward in the body width direction at right angles, and is hence, as a whole, formed into a U shape as viewed in a horizontal plane. That is, the longitudinal wall 15a and the front and rear transverse walls 15b and 15c of the reinforcement member 15 are formed integrally with one another. The longitudinal wall 15a has the front end portion thereof overlapped with the rear end portions of the front side member 2 and the front inner side member 2b, and has the rear end portion thereof overlapped with the front end portion of the inner side sill reinforcement 4. Each of the transverse walls 15b and 15c is formed into the same shape (trapezoid) as the cross sectional shape of the side sill outer reinforcement 5, and constitutes a bulkhead which increases the rigidity of the side sill 3 in the body width direction. More specifically, as shown in FIG. 3, the transverse walls 15b and 15c are each formed into an irregular hexagonal shape by modifying the trapezoid in such a manner that each of two oblique sides of the trapezoid is comprised of two sections which have different inclinations. The transverse walls 15b and 15c are provided with holes for making these walls lightweight and for improving the flow of the electro deposition paint.

The front transverse wall 15b is formed at its upper, lower and outer ends with weldment pieces 15d, 15e and 15f which are formed integrally therewith. These elements 15d to 15f extend forward in the body longitudinal direction. Similar weldment pieces 15g, 15h and 15i are formed in the rear transverse wall 15c. These elements 15g to 15i extend backward in the body longitudinal direction. The longitudinal wall 15a has a front edge portion thereof provided at two points (upper and lower points) with bolt insertion holes 15j and 15k, the rear edge portion thereof formed at two points (upper and lower points) with bolt insertion holes 15l and 15m, and a lower edge portion thereof formed at the center with a bolt insertion hole 15n. Furthermore, the longitudinal wall 15a has the outer surface (as viewed in the body width direction) thereof on which weld nuts 17 to 21 are welded in alignment with the bolt insertion holes 15j to 15n, respectively. In the FIG. 3, hatched circular marks given to the weldment pieces 15d to 15i indicate positions for spot welding.

As shown in FIG. 2, the opposite end portions (the left end portion is indicated by reference numeral 16a) of the second reinforcement member 16 are bent upward at about right angles. Each end portion 16a of the second reinforcement member 16 is formed with bolt holes 16b and 16c in alignment with the bolt insertion holes 15k and 15n (FIG. 3) formed in the first reinforcement member 15. The right end portion (not shown) of the second reinforcement member 16 is designed in a manner similar to the left end portion 16a. The second reinforcement member 16 is disposed on the upper surface of a front floor pan 11 (FIG. 4), and constitutes a floor brace which increases the rigidity of the left and right side sills 3 in the body width direction.

The front side member 2 and the inner front side member 2b have their rear end portions formed with bolt insertion holes in alignment with the bolt insertion holes 15j and 15k formed in the first reinforcement member 15. The side sill inner reinforcement 4 is formed at the front end portion with bolt insertion holes in alignment with the bolt insertion holes 15l and 15m of the reinforcement member 15. Moreover, the inner side sill 3b has a front end portion thereof formed with bolt insertion holes in alignment with the bolt insertion holes 15j, 15k, 15l, 15m and 15n of the reinforcement member 15.

As shown in FIGS. 2, 4, and 5, the first reinforcement member 15 is fitted into the side sill outer reinforcement 5 formed at the junction 3A between the front end portion of the side sill 3 and the rear end portion 2a of the front side member 2. The weldment pieces 15d, 15e, 15f, 15g, 15h and 15i of the transverse walls 15b and 15c are spot-welded to the inside surfaces of the upper, lower and outer walls of the side sill outer reinforcement 5. The transverse walls 15b and 15c function as bulkheads for increasing the rigidity of the side sill outer reinforcement 5 in the body width direction. The positions for spot welding are indicated by black circular marks in FIG. 2, and by X-marks in FIGS. 4 and 5.

With reference to FIGS. 2, 4 and 5, the connecting construction and assembling method in respect of the junction 3A between the front side member 2 and the side sill 3 will be described.

Here, it is assumed that the front side member 2 and the inner front side member 2b welded thereto are disposed in a state shown in FIG. 2. In this state, the inner side sill 3b is first disposed so that the front end portion of the inner side sill 3b is overlapped with the rear end portions of the front side member 2 and the inner front side member 2b, and so that the front end of the inner side sill 3b is located in a specified position shown in FIG. 2 in the body longitudinal direction. The thus-positioned state is kept by means of a suitable means. Next, the side sill inner reinforcement 4 is disposed to overlap the inner side sill 3b, while positioning the side sill inner reinforcement 4 so that two bolt insertion holes formed in the front end portion of the side sill inner reinforcement 4 are in alignment with two bolt insertion holes which are formed in the inner side sill 3b and which respectively correspond to the bolt insertion holes 15l and 15m of the first reinforcement member 15. In this state, the inner side sill 3b and the side sill inner reinforcement 4 are welded together by spot welding. On the other hand, the front and rear walls 15b and 15c of the first reinforcement member 15 are spot-welded to specified positions of the side sill outer reinforcement 5, thereby welding the first reinforcement member 15 to the side sill outer reinforcement 5.

Next, the first reinforcement member 15 and the side sill outer reinforcement 5 welded thereto are positioned so that the bolt insertion holes 15l and 15m formed in the rear end portion of the longitudinal wall 15a of the first reinforcement member 15 are in alignment with the corresponding bolt insertion holes of the inner side sill 3b and the side sill inner reinforcement 4, respectively, and so that the bolt insertion holes 15j and 15k formed in the front end portion of the longitudinal wall 15a are in alignment with two bolt insertion holes formed in the front end portion of the inner side sill 3b. By doing this, the bolt insertion hole 15n formed in the lower edge portion of the longitudinal wall 15a is naturally brought in alignment with the corresponding bolt insertion hole of the inner side sill 3b.

In the thus positioned state, two bolts 23 are inserted into the bolt insertion holes 15l and 15m and the bolt insertion holes related to these holes, and are screwed into weld nuts 19 and 20, respectively. By fastening these bolts 23, the inner side sill 3b, the side sill inner reinforcement 4, and the first reinforcement member 15 are secured together, as shown in FIG. 5. Furthermore, a bolt 23 is inserted into the bolt insertion hole 15j and the related bolt insertion hole and is screwed into the weld nut 17, and then the bolt 23 is fastened, thereby securing the front side member 2, the inner front side member 2b, the inner side sill 3b, and the longitudinal wall 15a together.

Next, the end portion 16a of the second reinforcement member 16 is positioned so that the bolt insertion hole 16b formed in end portion 16a is in alignment with the bolt insertion hole 15k formed in the longitudinal wall 15a of the first reinforcement member 15 and bolt insertion holes, corresponding to the hole 15k, of the front side member 2, the front side member inner 2b, and the inner side sill 3b. Therefore, the bolt insertion hole 16c formed in the aforementioned end portion 16a is in alignment with the bolt insertion hole 15n of the longitudinal wall 15a and a bolt insertion hole of the inner side sill 3b corresponding to the hole 15n. In this state, a bolt 23 is inserted into the bolt insertion hole 16b and the related bolt insertion holes and is screwed into the weld nut 18. By fastening the bolt 23, the second reinforcement member 16, the front side member 2 (omitted in FIG. 4), the inner front side member 2b, the inner side sill 3b, and the longitudinal wall 15a are mutually secured, as shown in FIG. 4. Moreover, a bolt 23 is inserted into the bolt insertion hole 16c and the related bolt insertion holes and is screwed into the weld nut 21. The second reinforcement member 16, the inner side sill 3b, and the longitudinal wall 15a are mutually secured by fastening the bolt 23.

Finally, the outer side sill 3a is positioned outwardly of the side sill outer reinforcement 5 in the body width direction. On the side of the junction 3A close to the front of the body, respective upper edges of the inner front side member 2b, the front side member 2 (omitted in FIG. 4), the inner side sill 3b, the side sill outer reinforcement 5, and the outer side sill 3a are welded, for example, by spot welding. Similarly, lower edges of the elements 2, 2b, 3a, 3b, 5 and the like are welded, thereby securing these elements together. Moreover, on the side of the junction 3A close to the rear of the body, upper and lower edges of the inner side sill 3b, the side sill outer reinforcement 5, and the outer side sill 3a are welded, to thereby secure these elements together.

As mentioned above, the assembly of the left side junction 3A between the left front side member 2 and the left side sill 3 is finished. The right side junction is assembled in a similar manner.

The operation of the body construction having the aforementioned structure will be described below.

When a car is in an offset crash on, for example, the left side of the front body 1F as shown by the arrow A in FIG. 1, an impact force Fa is applied through the left front side member 2 to the junction 3A between the rear end portion 2a of the left front side 2 and the front end portion of the left side sill 3, as mentioned above. The impact force Fa acts upward in the body height direction and inward in the body width direction, and produces a bending moment.

At this time, the front and rear walls 15b and 15c (bulkheads) of the first reinforcement member 15 provided in the junction 3A prevent a cross sectional deformation (crush) of the left side sill 3. The longitudinal wall 15a of the first reinforcement member 15 prevents upward and inward deformations of the left side sill 3. Deformations can be prevented because the front end portion of the longitudinal wall 15a is tightened and secured to the front side member 2, the front side member inner 2b, and the inner side sill 3b by the weld nuts 17, 18 and the bolts 23 screwed into these nuts, and because the rear end portion of the longitudinal wall 15a is tightened and secured to the inner side sill 3b and the side sill inner reinforcement 4 by the weld nuts 19, 20 and the bolts 23 screwed thereinto, whereby the rigidity of the junction 3A is increased so that the junction 3A can resist the bending moment. Furthermore, the second reinforcement member 16 prevents the left side sill 3 from being bent inward. Thus, a bending deformation of the left side sill 3 is prevented, so that the recession of the front pillar 1A at the time of the offset crash is decreased. Therefore, deformation of the passenger cabin is restrained. This also applies to the case of an offset crash on the right side of the body.

In the case of head-on crash shown by the arrow B in FIG. 1, the left and right side sills 3 are prevented from being deformed outward in the body width direction, since these side sills 3 are mutually secured at the junctions 3A through the second reinforcement member (floor brace) 16. Consequently, a deformation of the cabin is restrained. Moreover, the second reinforcement member 16 prevents the left and right side sills from being bent inward when a bending moment acts on the left and right junctions 3A. That is, the left and right side sills 3, reinforced by the second reinforcement member 16, resist the bending moment.

In the present embodiment, a second reinforcement member 16 made of a flat plate is used. However, it is preferable to use a second reinforcement member 16 having a hat-shaped cross section or a box-like cross section for ensuring the strength thereof.

A body construction according to a second embodiment of the present invention will be described below.

As compared to the first embodiment, this embodiment is characterized in that the rigidity of the first reinforcement member, and therefore the rigidity of the junction between the front side member and the side sill are further improved. In other points, the present embodiment is the same as the first embodiment. Accordingly, the description of structure and operation of elements other than the first reinforcement member will be omitted.

Figure 6:
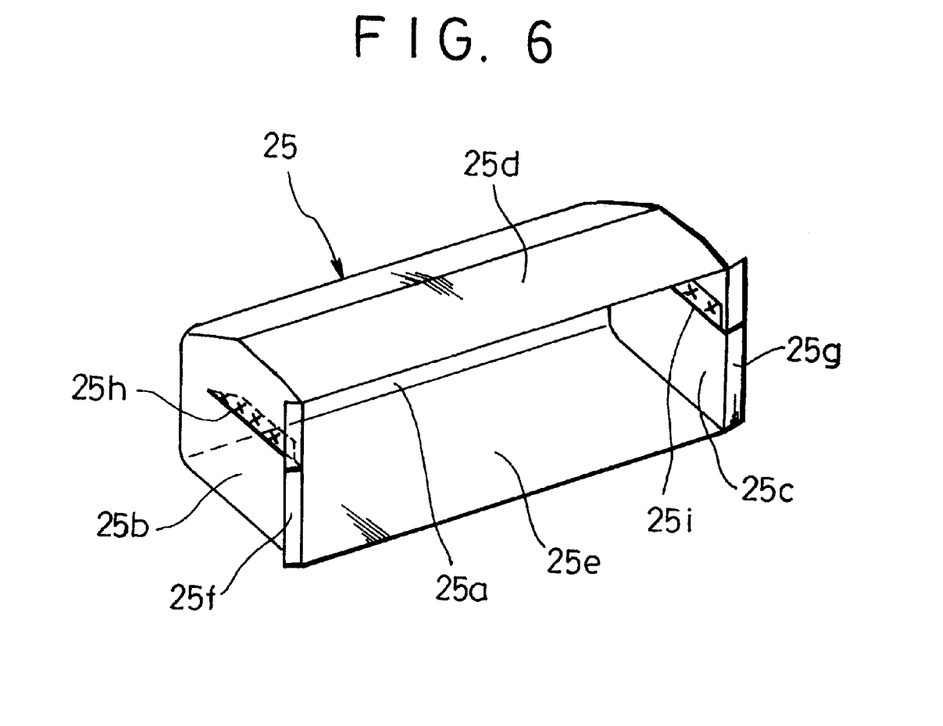
FIG. 6 is a perspective view showing a first reinforcement member used in the body construction according to a second embodiment of the present invention.

As shown in FIG. 6, a first reinforcement member 25 of the present embodiment has a longitudinal wall 25a, a front wall 25b, a rear wall 25c, an upper wall 25d, and a lower wall 25e which are integrated with one another. This member 25 is formed, as a whole, into a box shape. In other words, the first reinforcement member 25 has the upper wall 25d extending between the upper edges of the front and rear walls 25b and 25c and the lower wall 25e extending between the lower edges of the front and rear walls 25b and 25c, in addition to the elements 25a, 25b, and 25c respectively corresponding to the longitudinal wall 15a, the front wall 15b, and the rear wall 15c in the first embodiment. The first reinforcement member 25, which has an open face on the side close to the side sill outer reinforcement, is integrally formed at its front and rear walls 25b and 25c with weldment pieces 25f and 25g. These weldment pieces extend from the ends, on the open face side, of the front and rear walls 25b, 25c of the reinforcement member 25 forward and backward in the body longitudinal direction, respectively. The first reinforcement member 25 is welded at its weldment pieces 25f, 25g to the side sill outer reinforcement 5.

In order to closely fit the first reinforcement member 25 into the accommodation space of the side sill outer reinforcement 5 (FIGS. 2, 4 and 5), and to increase the rigidity of the junction 3A (FIG. 2) between the front side member and the side sill, the first reinforcement member 25 is produced as follows:

First, a box-like member corresponding to the first reinforcement member 25 and having two walls corresponding to the front wall 25b and the rear wall 25c of the member 25 is obtained by deep drawing. Next, horizontal notches 25h and 25i are formed at central portions of these two walls of the box-like member from the weldment pieces 25f, 25g sides of the walls. Then, wall portions, adjacent to the notch 25h or 25i, of each wall of the box-like member are overlapped as shown by the broken or solid line in FIG. 6, so as to make the box-like member closely fit in the accommodation space of the side sill outer reinforcement 5. Furthermore, the thus overlapped portions are welded, as shown by the X-marks in FIG. 6. Finally, the outer end portions of the front and rear walls of the box-like member are bent to form the weldment pieces 25f, 25g, thereby obtaining the first reinforcement member 25.

As in the case of the first reinforcement member 15 of the first embodiment, the first reinforcement member 25 thus obtained is disposed in the side sill outer reinforcement 5 and its weldment pieces 25f and 25g are welded to the inside surface of the side sill outer reinforcement 5. Then, the side sill outer reinforcement 5 is disposed between the outer side sill 3a and the inner side sill 3b of the side sill 3 in the junction 3A between the front side member 2 and the side sill 3. Consequently, the strength of the side sill 3 and the junction 3A is largely improved.

Next, a body construction according to a third embodiment of the present invention will be described.

The body of the first embodiment is a so-called perimeter frame construction (FIG. 1) in which side rails such as front side members 2 and side sills 3 are provided around the floor (floor pan 11) of the body, and in which the extensions of the front side members which connect the front side members 2 with the side sills 3 are comprised of the rear end portions 2a of the front side members 2. That is, the extensions 2a of the front side members are integrally formed with the front side members 2.

Figure 7:
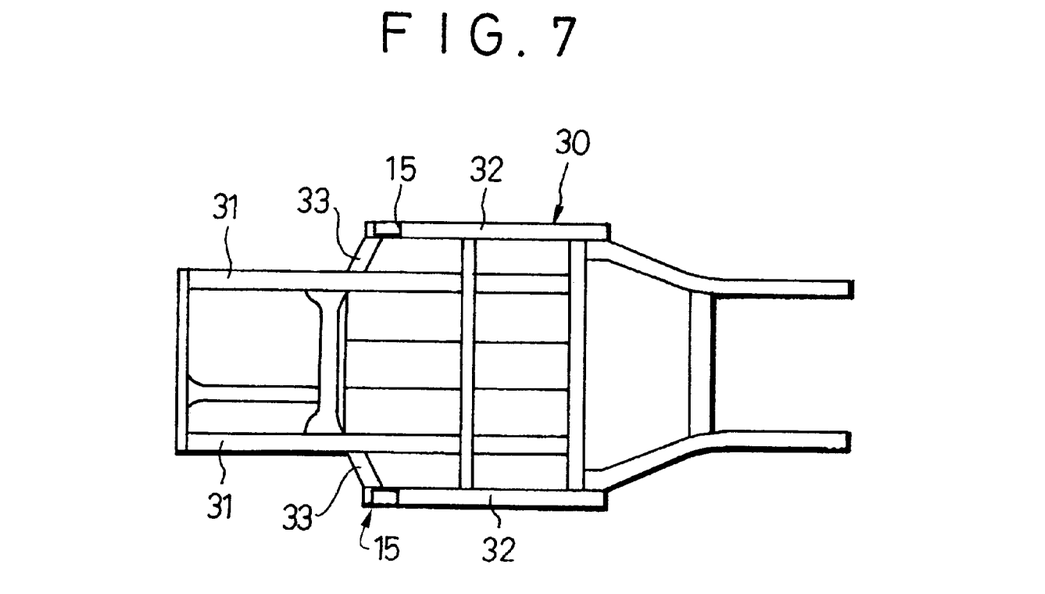
FIG. 7 is a plan view of a frame construction used in the body construction according to a third embodiment of the present invention.
Figure 8:
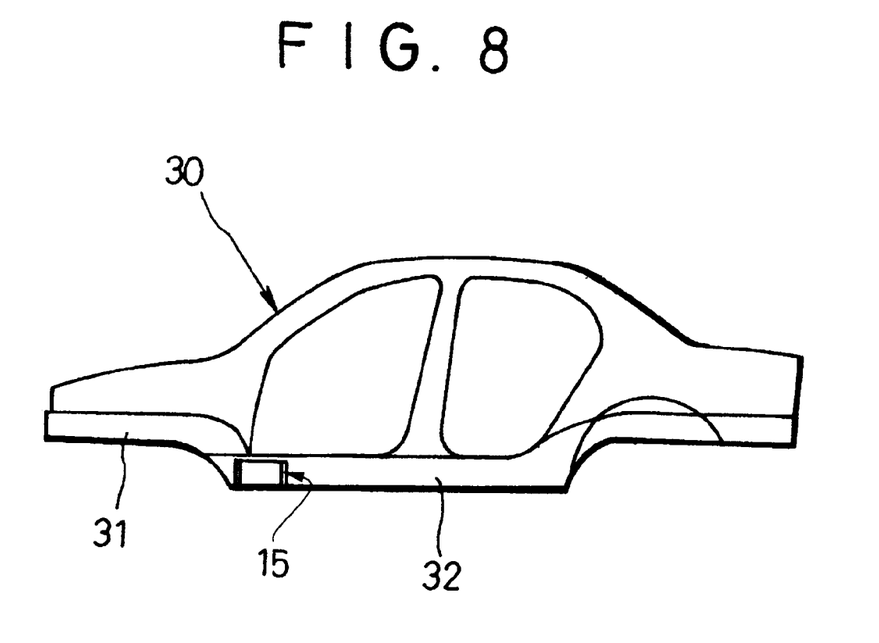
FIG. 8 is a side view showing a body having the frame construction shown in FIG. 7.

As shown in FIG. 8, a body 30 of the present embodiment has a frame (part of which is shown in FIG. 7) belonging to a so-called ladder frame construction which is different from the perimeter frame construction of the first embodiment. Preferably, the body 30 is comprised of a unitary construction having an integrated frame shown in FIG. 7. The frame of FIG. 7 has front side frames 31 and side sills 32 respectively corresponding to the front side members 2 and the side sills 3 of the first embodiment. Each front side frame 31 and the side sill 32 associated therewith are connected through a connecting member 33 (corresponding to the rear end portion 2a of the front side member of the first embodiment), which is separate from the front side frame 31. In other words, a front side member extension which is separate from the front side member is used. The first reinforcement member 15 is disposed in the vicinity of the junction between the front end of the side sill 32 and the connecting member 33, to thereby increase the rigidity of the junction.

The present invention is not limited to the first, second, and third embodiments, and various modifications can be made.

For example, in the above described embodiments, the present invention is applied to a frameless body construction, but the present invention can also be applied to a body with a frame.

What is claimed is:

1. A vehicle body construction comprising:
   left and right front side members provided on opposite lateral sides of a body, and each extending in a longitudinal direction of said body;
   left and right side sills extending in the longitudinal direction of said body, longitudinally rearward of said front side members, wherein each said side sill comprises an inner side sill and an outer side sill shaped and arranged so as to define a rectangular cross-section;
   left and right front side member extensions extending between said left and right front side members and said left and right side sills, respectively;
   inner front side members located rearwardly from rear end portions of said front side members;
   inner side sill reinforcements disposed to overlap the front end portions of said side sills; and
   wherein said longitudinal wall of each of said first reinforcement members has a front end portion overlapped with a respective inner front side member, and a rear end portion overlapped with the front end portion of said inner side sill reinforcements; and
   left and right first reinforcement members provided between said left and right front side members and said left and right side sills, respectively,
   wherein each said first reinforcement member includes:
      a longitudinal wall extending in the longitudinal direction of said body, and
      at least one transverse wall extending from said longitudinal wall in a width direction of said body;
   wherein said longitudinal wall of each of said first reinforcement members has a front end portion overlapped with a respective inner front side member, and a rear end portion overlapped with the front end portion of said inner side sill reinforcements; and
   wherein each said longitudinal wall is secured to respective said inner side sills of said right and left side sills at locations adjacent to front and rear edges of each said longitudinal wall.

2. The body construction according to claim 1, wherein said left and right front side member extensions are formed integrally with said left and right front side members, respectively, and form rear end portions of said left and right front side members, respectively.

3. The body construction according to claim 1, wherein said left and right front side member extensions are comprised of connecting members which are separate from said front side members.

4. The body of construction according to claim 1, further comprising:
   A second reinforcement member extending in the lateral direction of the body, between respective portions of said left and right side sills to which said first reinforcement members are respectively secured, said second reinforcement member connecting said portions to each other.

5. The body construction according to claim 4, further comprising:
   a front floor pan having an upper face,
   wherein said second reinforcement member is disposed on said upper face of said front floor pan.

6. The body construction according to claim 1, wherein each said first reinforcement members includes front and rear transverse walls respectively extending from front and rear ends of said longitudinal wall in the width direction of the body.

7. The body construction according to claim 6, further comprising:
   side sill outer reinforcements secured to respective said inner side sills of said left and right side sills, each said side sill outer reinforcements defining therein an accommodation space in which a respective said first reinforcement member is received and which is open on a side thereof adjacent to the inner side sill associated therewith,
   wherein said front and rear transverse walls of said first reinforcement members are disposed in the accommodation space of and are secured to said side sill outer reinforcements associated therewith.

8. The body construction according to claim 1, wherein rear ends of said first side members and said inner front side members are positioned on a side close to a front of the body with respect to a front end of said inner side sill reinforcement in the longitudinal direction of the body, so as to be spaced from the front end of said inner side sill reinforcement.

9. The body construction according to claim 1, wherein said front end portion of said longitudinal wall of said first reinforcement member, a rear end portion of said inner front side member, and the front end portion of said side sill are mutually fastened at two points which are spaced from each other in the height direction of the body;
   wherein said rear end portion of said longitudinal wall of said first reinforcement member, said front end portion of said side sill, and a front end portion of said inner side sill reinforcement are mutually fastened at two points which are spaced from each other in the height direction of the body; and
   wherein an intermediate portion of said longitudinal wall of said first reinforcement member and said front end portion of the side sill concerned are mutually fastened at one position located in an area between the rear ends of the front side member and said inner front side member and the front end of said inner side sill reinforcement in the longitudinal direction of the body.

10. The body construction according to claim 1, further comprising:

a second reinforcement member extending in the lateral direction of the body, between respective portions of said left and right side sills to which said first reinforcement members are respectively secured, said second reinforcement member connecting said portions to each other, wherein said second reinforcement member is bent at its opposite end portions, said opposite end portions extending along inside surfaces of said front end portions of said side sills, respectively;

wherein each end portion of said second reinforcement member is fastened together with said longitudinal walls of respective said first reinforcement, said front side members, said inner front side members, and the side sill, at locations where said front end portion of said longitudinal wall of said first reinforcement member, said rear end portion of said inner front side member, and said front end portion of the side sill are fastened together; and wherein each end portion of said second reinforcement member is fastened together with said longitudinal wall of said first reinforcement member and said side sill in an area between said inner front side member and the front end of said side sill reinforcement inner in the longitudinal direction of the body.

11. The body construction according to claim 1, wherein each of said first reinforcement members has an upper wall thereof extending between upper edges of the front and rear transverse walls, and a lower wall thereof extending between lower edges of the front and rear transverse walls, and each first reinforcement member is formed into a box shape.

12. The body construction according to claim 11, wherein each of said first reinforcement members is fabricated from a box-like member obtained by deep drawing and having walls thereof respectively corresponding to the front and rear transverse walls of said first reinforcement member concerned, the walls of the box-like member being each formed with a notch, wall portions, adjacent to the notch, of each wall of the box-like member being overlapped one another and welded together, whereby each first reinforcement member is so fabricated as to be closely fitted into the accommodation space of said side sill outer reinforcement concerned.

* * * * *